(12) United States Patent
Li et al.

(10) Patent No.: US 11,970,629 B2
(45) Date of Patent: Apr. 30, 2024

(54) AQUEOUS DISPERSION OF MULTISTAGE POLYMER PARTICLES AND PROCESS OF MAKING THE SAME

(71) Applicants: Dow Global Technologies LLC, Midland, MI (US); Rohm and Haas Company, Collegeville, PA (US)

(72) Inventors: Yan Li, Shanghai (CN); Tao Wang, Highton (AU); Junyu Chen, Shanghai (CN); Tao Wang, Shanghai (CN); James C. Bohling, Lansdale, PA (US); Zhi Juan Gong, Shanghai (CN); Yuehan Hu, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 729 days.

(21) Appl. No.: 16/973,604

(22) PCT Filed: Jul. 10, 2018

(86) PCT No.: PCT/CN2018/095099
§ 371 (c)(1),
(2) Date: Dec. 9, 2020

(87) PCT Pub. No.: WO2020/010510
PCT Pub. Date: Jan. 16, 2020

(65) Prior Publication Data
US 2021/0253893 A1    Aug. 19, 2021

(51) Int. Cl.
*C09D 133/12* (2006.01)
*C08F 220/14* (2006.01)
*C08F 265/00* (2006.01)
*C08F 265/06* (2006.01)

(52) U.S. Cl.
CPC .......... *C09D 133/12* (2013.01); *C08F 220/14* (2013.01); *C08F 265/00* (2013.01); *C08F 265/06* (2013.01)

(58) Field of Classification Search
None
See application file for complete search history.

(56) References Cited

U.S. PATENT DOCUMENTS

| | | |
|---|---|---|
| 5,270,380 A | 12/1993 | Adamson et al. |
| 5,610,225 A | 3/1997 | Farwaha et al. |
| 6,270,905 B1 | 8/2001 | Swarup et al. |
| 6,489,381 B1 | 12/2002 | Dreher et al. |

(Continued)

FOREIGN PATENT DOCUMENTS

| | | |
|---|---|---|
| WO | 2004085556 | 10/2004 |
| WO | 2012087920 | 6/2012 |

(Continued)

OTHER PUBLICATIONS

Supplementary European Search Report for the corresponding European Application No. 18926319; dated Feb. 2, 2022; 7 pages.

*Primary Examiner* — Nicole M. Buie-Hatcher
(74) *Attorney, Agent, or Firm* — Susan M. Zerull

(57) ABSTRACT

An aqueous dispersion of multistage polymer particles comprising a specific oligomer prepared from polymerization of monomers comprising an alkoxylated (meth)acrylate providing aqueous coating compositions with both good flow-and-leveling property and extended open time.

13 Claims, 1 Drawing Sheet

Scan transmission electron microscopy images of aqueous dispersions

(56) References Cited

U.S. PATENT DOCUMENTS

| | | | |
|---|---|---|---|
| 6,992,121 | B1 | 1/2006 | Peters et al. |
| 7,208,544 | B2 | 4/2007 | Kawase et al. |
| 7,223,813 | B2 | 5/2007 | Buckmann et al. |
| 7,569,636 | B2 | 8/2009 | Tennebroek et al. |
| 8,013,050 | B2 | 9/2011 | Mestach et al. |
| 10,590,290 | B2 * | 3/2020 | Li .................. C08F 220/1808 |
| 10,597,553 | B2 | 3/2020 | Akkerman et al. |
| 11,384,165 | B2 * | 7/2022 | Liu ..................... C09D 5/027 |
| 2001/0031826 | A1 | 10/2001 | Laubender et al. |
| 2017/0198130 | A1 | 7/2017 | Kim et al. |

FOREIGN PATENT DOCUMENTS

| | | |
|---|---|---|
| WO | 2015107163 | 7/2015 |
| WO | 2017214918 A1 | 12/2017 |

* cited by examiner

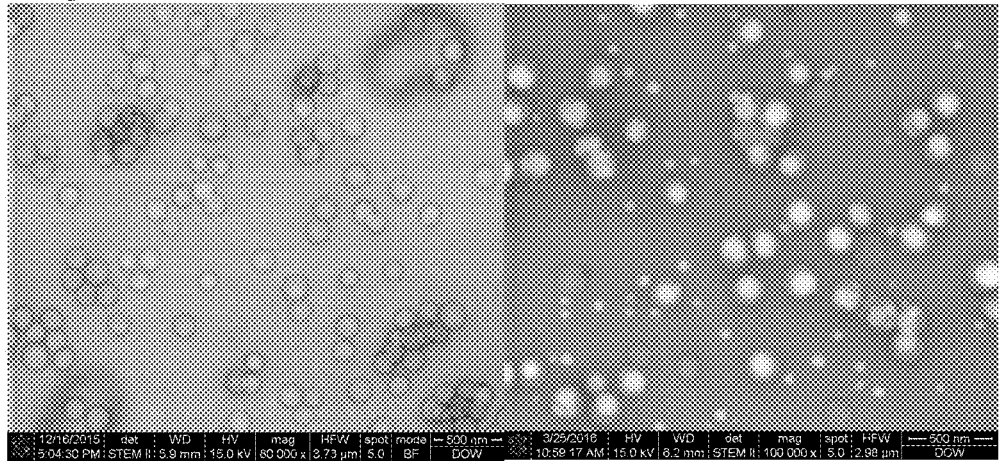
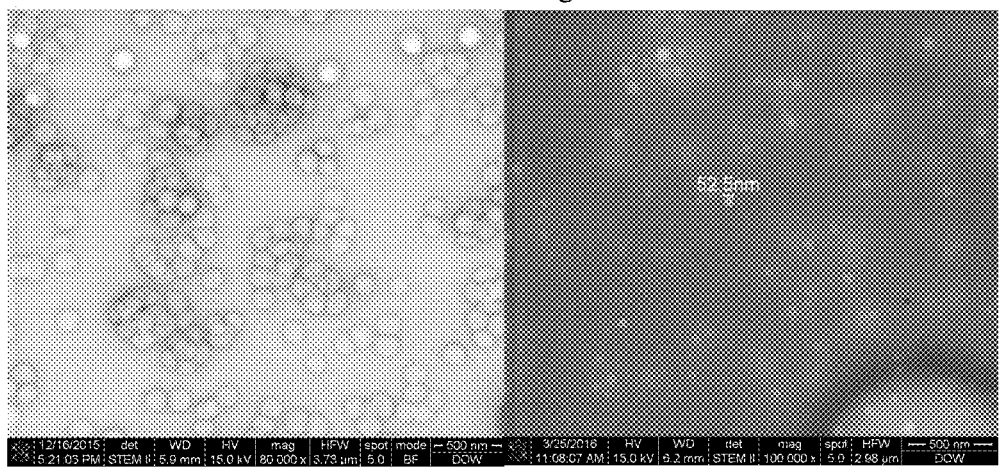
Scan transmission electron microscopy images of aqueous dispersions

AQUEOUS DISPERSION OF MULTISTAGE POLYMER PARTICLES AND PROCESS OF MAKING THE SAME

FIELD OF THE INVENTION

The present invention relates to an aqueous dispersion of multistage polymer particles and a process of making the same.

INTRODUCTION

Water based trim enamel using waterborne acrylic polymers is a popular do-it-yourself (DIY) segment in Australia, New Zealand, Europe and North America, which has successfully replaced most of solvent based alkyd products and applied onto doors, windows and some furniture. Compared to solvent based alkyd paints, one of drawbacks for waterborne acrylic paints is short open time. For example, coating compositions comprising waterborne acrylic polymers usually have a repair time less than 3 minutes. Open time is important in aqueous coatings, such as latex paints, to permit refreshing over a freshly coated wet surface without causing defects such as lap lines in the final dried coating.

Attempts have been made to prolong the open time of coating compositions comprising waterborne acrylic latexes. One method for improving the open time of aqueous coating compositions is disclosed in U.S. Pat. No. 5,270,380. This method involves the reactive interaction between a latex polymer and a modifying compound in which the latex polymer and modifying compound become chemically bound. The problem is that a given modifying compound will only work with a limited number of latex polymers, and therefore many different modifying compounds are required to effect an open time improvement across the wide range of possible latex polymers used in different coating compositions. However, glycols have been used in coating compositions to increase open time, but most of glycols are volatile organic compounds (VOCs), which are less environmentally friendly and less desirable than aqueous systems. Introducing conventional open time extenders (OTEs) into aqueous acrylic polymer binders can also extend open time of the obtained coating compositions. As these OTEs usually have surfactant nature, addition of OTEs may increase water sensitivity of coating films, decrease stain and scrub resistance, and compromise block resistance and wet adhesion to aged alkyd coatings.

For trim paint applications, smooth finish is also a key requirement for coatings. One of conventional approaches to achieve satisfactory flow-and-leveling property and an improvement in coating defects is reducing viscosity at low shear rates, which tends to cause sagging and running of the coating composition during its application. Addition of rheology modifiers can adjust the viscosity of coating compositions, but is usually difficult to achieve balanced flow-and-leveling and sag resistance properties.

Therefore, it is desirable to provide an aqueous emulsion polymer particularly suitable for use in aqueous coating compositions that have extended open time and good flow-and-leveling property without sagging.

SUMMARY OF THE INVENTION

The present invention provides a novel aqueous dispersion of multistage polymer particles comprising a specific dosage of an oligomer that is prepared from polymerization of monomers comprising an alkoxylated (meth)acrylate. The aqueous dispersion of the present invention can provide aqueous coating compositions with better flow-and-leveling property and extended open time, as compared to a one-stage polymer comprising structural units of the alkoxylated (meth)acrylate, or multistage polymer particles free of the oligomer above.

In a first aspect, the present invention is an aqueous dispersion of multistage polymer particles comprising: an oligomer, a polymer A, and optionally a polymer B; wherein the oligomer has a weight average molecular weight of from 1,000 to 50,000 grams per mole (g/mol) and comprises:
structural units of an ethylenically unsaturated nonionic monomer, and
structural units of an alkoxylated (meth)acrylate having the structure of formula (I),

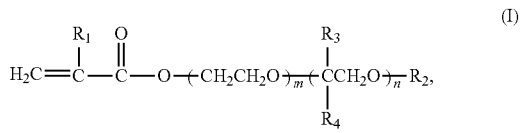

wherein $R_1$ is H or $CH_3$, $R_2$ is H or a $C_1$-$C_6$ alkyl group, $R_3$ and $R_4$ are each independently H or $CH_3$, m is an integer of from 4 to 50, and n is an integer of from 0 to 6;
wherein the multistage polymer particles comprise more than 1% and less than or equal to 30% of the oligomer, by weight based on the weight of the multistage polymer particles.

In a second aspect, the present invention is a process of preparing an aqueous dispersion of a multi-stage aqueous emulsion polymer by multistage polymer particles by multistage free-radical polymerization. The process comprises:
at least one stage of polymerization forming a polymer A,
at least one stage of polymerization forming an oligomer in the presence of a chain transfer agent, and
optionally at least one stage of polymerization forming a polymer B; wherein the oligomer has a weight average molecular weight of from 1,000 to 50,000 g/mol and comprises:
structural units of an ethylenically unsaturated nonionic monomer, and
structural units of an alkoxylated (meth)acrylate having the structure of formula I,

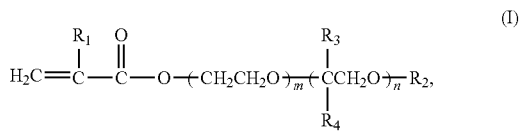

wherein $R_1$ is H or $CH_3$, $R_2$ is H or a $C_1$-$C_6$ alkyl group, $R_3$ and $R_4$ are each independently H or $CH_3$, m is an integer of from 4 to 50, and n is an integer of from 0 to 6;
wherein the multistage polymer particles comprise more than 1% and less than or equal to 30% of the oligomer, by weight based on the weight of the multistage polymer particles.

In a third aspect, the present invention is an aqueous coating composition comprising the aqueous dispersion of the first aspect.

BRIEF DESCRIPTION OF THE DRAWINGS

FIG. 1 is a series of scan transmission electron microscopy (STEM) images of polymer particles in aqueous dispersions of Example (Ex) 2, Comparative (Comp) Ex D, and Comp Ex E, and the oligomer dispersion OD1 used in Comp Ex E.

DETAILED DESCRIPTION OF THE INVENTION

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" ($T_g$) in the present invention can be measured by various techniques including, for example, differential scanning calorimetry (DSC) or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, w($M_1$) is the weight fraction of monomer $M_1$ in the copolymer, w($M_2$) is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$; all temperatures being in K. The glass transition temperatures of the homopolymers may be found, for example, in "Polymer Handbook", edited by J. Brandrup and E. H. Immergut, Interscience Publishers.

As used herein, the term structural units, also known as polymerized units, of the named monomer refers to the remnant of the monomer after polymerization, or the monomer in polymerized form. For example, a structural unit of methyl methacrylate is as illustrated:

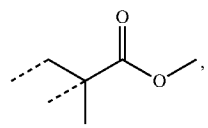

where the dotted lines represent the points of attachment of the structural unit to the polymer backbone.

"Aqueous" composition or dispersion herein means that particles dispersed in an aqueous medium. By "aqueous medium" herein is meant water and from zero to 30%, by weight based on the weight of the medium, of water-miscible compound(s) such as, for example, alcohols, glycols, glycol ethers, glycol esters, and the like.

"Multistage polymer particles" herein means polymer particles prepared by the sequential addition of two or more different monomer compositions. By "oligomer", "polymer A", and "polymer B" mean these polymers and oligomer having different compositions regardless of the order in which they were prepared in a multistage free-radical polymerization process.

The aqueous dispersion of the present invention may comprise at least one oligomer, and one or more polymers that are different from the oligomer, e.g., polymer A and/or polymer B. The oligomer, the polymer A, and the polymer B are different from each other and formed in different stages of multistage free-radical polymerization in preparing the multi-stage aqueous emulsion polymer. Each of the stages is sequentially polymerized and different from the immediately proceeding and/or immediately subsequent stage by a difference in monomer composition.

The oligomer herein refers to a polymer having a weight average molecular weight of from 1,000 to 50,000 g/mol, for example, 1,000 g/mol or more, 2,000 g/mol or more, 3,000 g/mol or more, 4,000 g/mol or more, 5,000 g/mol or more, 6,000 g/mol or more, 7,000 g/mol or more, 8,000 g/mol or more, 9,000 g/mol or more, or even 10,000 g/mol or more, and at the same time, 50,000 g/mol or less, 48,000 g/mol or less, 45,000 g/mol or less, 42,000 g/mol or less, 40,000 g/mol or less, 38,000 g/mol or less, 35,000 g/mol or less, 32,000 g/mol or less, 30,000 g/mol or less, 28,000 g/mol or less, 25,000 g/mol or less, or even 20,000 g/mol or less, as determined by Gel Permeation Chromatography (GPC) analysis described in the Examples section below.

The oligomer in the multistage polymer particles may comprise structural units of one or more alkoxylated (meth)acrylates. The alkoxylated (meth)acrylates useful in the present invention may have the structure of formula I,

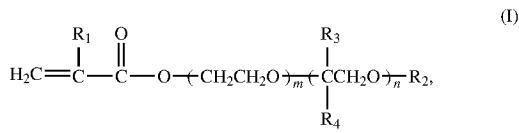

wherein $R_1$ is H or $CH_3$, $R_2$ is H or a $C_1$-$C_6$ alkyl group, $R_3$ and $R_4$ are each independently H or $CH_3$, m is an integer of from 4 to 50, and n is an integer of from 0 to 6.

When the alkoxylated (meth)acrylate comprises a combination of ethylene oxide (—$CH_2CH_2O$—) units, propylene oxide (—$CH(CH_3)CH_2O$—) units, and/or butylene oxide (—$C(CH_3)_2CH_2O$—) units, these units may alternate or may be present in the form of polyethylene oxide, polypropylene oxide, and/or polybutylene oxide blocks. Preferably, $R_2$ is a $C_1$-$C_4$ alkyl group, and more preferably —$CH_3$. m can be an integer of from 5 to 45, from 6 to 40, from 8 to 35, from 9 to 30, or from 10 to 25. n can be an integer of from 0 to 5, from 0 to 3, or from 0 to 1, and preferably n is 0. Suitable commercially available alkoxylated (meth)acrylates include Bisomer S10W (methoxy polyethylene glycol 1000 methacrylate) available from GEO Specialty Chemicals UK Ltd. The oligomer may comprise, by weight based on the weight of the oligomer, 5% or more, 6% or more, 8% or more, 10% or more, 15% or more, or even 20% or more, and at the same time, 95% or less, 90% or less, 80% or less, 70% or less, 60% or less, 50% or less, or even 40% or less, of structural units of the alkoxylated (meth)acrylate. "Weight of the oligomer" in the present invention refers to dry weight or solids weight of the oligomer.

The oligomer in the multistage polymer particles may also comprise structural units of one or more ethylenically unsaturated nonionic monomers. As used herein, the term "nonionic monomers" refers to monomers that do not bear an ionic charge between pH=1-14. Suitable ethylenically unsaturated nonionic monomers may include, for example, alkyl esters of (meth)acrylic acids, vinyl aromatic monomers such as styrene and substituted styrene, vinyl esters of carboxylic acid, ethylenically unsaturated nitriles, or mixtures thereof. Preferably, the ethylenically unsaturated nonionic monomers are $C_1$-$C_{20}$, $C_1$-$C_{10}$, or $C_1$-$C_8$ alkyl esters of (meth)acrylic acids including, for example, methyl acrylate, methyl methacrylate, ethyl acrylate, butyl acrylate, butyl methacrylate, 2-ethylhexyl acrylate, iso-butyl (meth)acrylate, hexyl (meth)acrylate, lauryl (meth)acrylate, stearyl (meth)acrylate, cyclohexyl (meth)acrylate, benzyl(meth) acrylate, oleyl(meth)acrylate, palmityl (meth)acrylate, nonyl (meth)acrylate, decyl (meth)acrylate, dodecyl (meth)acrylate, pentadecyl (meth) acrylate, hexadecyl (meth)acrylate, octadecyl (meth)acrylate; hydroxyethyl (meth)acrylate, hydroxypropyl (meth)acrylate; (meth)acrylonitrile; or mixture thereof. More preferably, the ethylenically unsaturated nonionic monomers are selected from the group consisting of methyl methacrylate, ethyl acrylate, butyl methacrylate, butyl acrylate, and 2-ethylhexyl acrylate. The oligomer may comprise, by weight based on the weight of the oligomer, 5% or more, 6% or more, 8% or more, 10% or more, 15% or more, or even 20% or more, and at the same time, 95% or less, 90% or less, 80% or less, 70% or less, 60% or less, 50% or less, or even 40% or less, of structural units of the ethylenically unsaturated nonionic monomers.

The oligomer in the multistage polymer particles may comprise structural units of one or more ethylenically unsaturated ionic monomers. The term "ionic monomers" herein refers to monomers that bear an ionic charge between pH=1-14. The ethylenically unsaturated ionic monomers may include α, β-ethylenically unsaturated carboxylic acids and/or their anhydrides; a phosphorous-containing acid monomer, or salts thereof; 2-acrylamido-2-methylpropanesulfonic acid (AMPS), sodium salt of 3-allyloxy-2-hydroxy-1-propanesulfonic acid, sodium styrene sulfonate (SSS), sodium vinyl sulfonate (SVS); and mixtures thereof. Examples of suitable α, β-ethylenically unsaturated carboxylic acids include an acid-bearing monomer such as acrylic acid, methacrylic acid, maleic acid, itaconic acid, crotonic acid, or fumaric acid; or a monomer bearing an acid-forming group which yields or is subsequently convertible to, such an acid group (such as anhydride, (meth)acrylic anhydride, or maleic anhydride); mixtures thereof. Examples of suitable phosphorous-containing acid monomers and salts thereof include phosphoalkyl (meth)acrylates such as phosphoethyl (meth)acrylate, phosphopropyl (meth)acrylate, phosphobutyl (meth)acrylate; salts thereof; and mixtures thereof; $CH_2=C(R)-C(O)-O-(R^1O)_q-P(O)(OH)_2$, wherein R=H or $CH_3$ and $R^1$=alkyl, and q=1-10, such as SIPOMER PAM-100, SIPOMER PAM-200, and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. The oligomer may comprise, by weight based on the weight of the oligomer, from zero to 10%, from 0.1% to 8%, from 0.5% to 6%, from 1% to 5%, from 1.5% to 5%, or from 2% to 5%, of structural units of the ethylenically unsaturated ionic monomers.

The oligomer in the multistage polymer particles may also comprise structural units of one or more ethylenically unsaturated monomers carrying at least one functional group selected from amino, amide, acetoacetoxy, acetoacetamide, ureido, urea, and carbonyl. Examples of these monomers include (meth)acrylamide, hydroxyethyl ethylene urea methacrylate; diacetone acrylamide (DAAM), acetoacetoxyethyl (meth)acrylate such as acetoacetoxyethyl methacrylate (AAEM), acetoacetoxypropyl (meth)acrylate, acetoacetoxybutyl (meth)acrylate, 2,3-di(acetoacetamido) propyl(meth)acrylate, 2,3-di(acetoacetoxy) propyl (meth) acrylate, acetoacetamidoethyl(meth)acrylate, acetoacetamidopropyl(meth)acrylate, allyl acetoacetates, acetoactamidobutyl(meth)acrylate, vinyl acetoacetates, acetoacetamides, methacrylo ethylethylene urea, Cytec CYLINK C4, SIPOMER WAM an allyl ether of a substituted urea, and SIPOMER WAM II methacrylamidoethyl ethylene urea all commercially available from Solvay Group. Preferred monomer is methacrylo ethylethylene urea. The oligomer may comprise, by weight based on the weight of the oligomer, from zero to 10%, from 0.1% to 6%, or from 0.5% to 5%, of structural units of the ethylenically unsaturated monomers carrying at least one functional group.

In some embodiments, the oligomer comprises, by weight based on the weight of the oligomer, from 20% to 45% of structural units of the alkoxylated (meth)acrylate and from 55% to 80% of structural units of the ethylenically unsaturated nonionic monomer.

The multistage polymer particles in the aqueous dispersion of the present invention may comprise the oligomer in an amount of more than 1%, 1.5% or more, 2% or more, 2.5% or more, 3% or more, 3.5% or more, 4% or more, 4.5% or more, 5% or more, 5.5% or more, 6% or more, 6.5% or more, or even 7% or more, and at the same time, 30% or less, 25% or less, 20% or less, 18% or less, 16% or less, 15% or less, 14% or less, 13% or less, 12% or less, or even 10% or less, by weight based on the weight of the multistage polymer particles. "Weight of the multistage polymer particles" refers to the dry weight of the multistage polymer particles.

The multistage polymer particles useful in the present invention may further comprise the polymer A, the polymer B, or combinations thereof, that are different from the oligomer. The polymer A and/or B useful in the present invention may be each independently an acrylic polymer, a styrene acrylic polymer, a vinyl acrylic polymer, or mixtures thereof.

The polymer A and/or the polymer B useful in the present invention may each independently comprise structural units of one or more ethylenically unsaturated ionic monomers that can be selected from the same group as described above in the oligomer section above. Preferred ethylenically unsaturated ionic monomers include α, β-ethylenically unsaturated carboxylic acids and/or their anhydrides including, for example, acrylic acid, methacrylic acid, maleic acid, itaconic acid, crotonic acid, fumaric acid, or mixtures thereof. The polymer A and/or B may each independently comprise, by weight based on the weight of the polymer A and the polymer B, respectively, from 0.1% to 10%, from 0.5% to 8%, from 1% to 6%, from 1.5% to 5%, or from 2% to 5%, of structural units of the ethylenically unsaturated ionic monomers.

The polymer A and/or the polymer B useful in the present invention may each independently comprise structural units of one or more ethylenically unsaturated nonionic monomers that can be selected from the same group as described above in the oligomer section above. Preferred ethylenically unsaturated nonionic monomers are alkyl esters of (meth)

acrylic acids, and more preferably $C_1$-$C_{20}$, $C_1$-$C_{10}$, or $C_1$-$C_8$ alkyl esters of (meth)acrylic acids including, for example, methyl acrylate, methyl methacrylate, ethyl acrylate, butyl acrylate, butyl methacrylate, 2-ethylhexyl acrylate, and mixtures thereof. The polymer A and/or B may each independently comprise, by weight based on the weight of the polymer A and the polymer B, respectively, from 80% to 99.9%, from 82% to 98%, from 85% to 97%, or from 87% to 96%, of structural units of the ethylenically unsaturated nonionic monomer.

The polymer A and/or the polymer B useful in the present invention may each independently comprise structural units of one or more ethylenically unsaturated monomers carrying at least one functional group, which can be selected from the same group as described above in the oligomer section above. Preferred ethylenically unsaturated monomers carrying at least one functional group include diacetone acrylamide (DAAM). The polymer A and/or B may each independently comprise, by weight based on the weight of the polymer A and the polymer B, respectively, from 0 to 10%, from 0.1% to 6%, or from 0.5% to 5%, of structural units of the ethylenically unsaturated monomers carrying at least one functional group.

The polymer A and/or the polymer B useful in the present invention may each independently comprise structural units of one or more alkoxylated (meth)acrylate, which can be selected from the same group as described above in the oligomer section above. The polymer A and/or B may each independently comprise, by weight based on the weight of the polymer A and the polymer B, respectively, from zero to 10% or from 0.1% to 5% of structural units of the alkoxylated (meth)acrylate, for example, less than 4%, less than 3%, or even less than 1%.

The polymer A and/or polymer B useful in the present invention may each independently comprise, by weight based on the weight of the polymer A and the polymer B, respectively,
from 0.5% to 10% of structural units of the ethylenically unsaturated ionic monomer including, for example, acrylic acid, methacrylic acid, maleic acid, itaconic acid, crotonic acid, fumaric acid, or mixtures thereof;
from 85% to 99.5% of structural units of the ethylenically unsaturated nonionic monomer including, for example, alkyl esters of (meth)acrylic acids; and
from zero to 5% of structural units of the ethylenically unsaturated monomer carrying at least one functional monomer including, for example, DAAM.

The polymer A and/or the polymer B useful in the present invention may have different Tgs in the range of from −25 to 50° C. The polymer A and/or B each independently may have a weight average molecular weight of at least 60,000 g/mol, for example, from 60,000 to 1,000,000 g/mol, from 70,000 to 800,000 g/mol, from 80,000 to 600,000 g/mol, from 90,000 to 500,000 g/mol, or from 100,000 to 400,000 g/mol, as determined by GPC analysis as described in the Examples section below.

In some embodiments, the multistage polymer particles comprise the oligomer and the polymer A. In some other embodiments, the multistage polymer particles comprise the oligomer, the polymer A, and the polymer B. In some preferred embodiments, the multistage polymer particles comprise,
an oligomer comprising, by weight based on the weight of the oligomer, from 20% to 45% of structural units of the alkoxylated (meth)acrylate, and from 55% to 80% of structural units of the ethylenically unsaturated nonionic monomer;
a polymer A comprising, by weight based on the weight of the polymer A, from 0.5% to 10% of structural units of the ethylenically unsaturated ionic monomer, from 85% to 99.5% of the ethylenically unsaturated nonionic monomer, and from zero to 5% of structural units of the ethylenically unsaturated monomer carrying at least one functional monomer; and optionally
a polymer B comprising, by weight based on the weight of the polymer B, from 0.5% to 10% of structural units of the ethylenically unsaturated ionic monomer, from 85% to 99.5% of structural units of the ethylenically unsaturated nonionic monomer, and from zero to 5% of structural units of the ethylenically unsaturated monomer carrying at least one functional monomer;
wherein the multistage polymer particles comprise, by weight based on the weight of the multistage polymer particles, from 5% to 15% of the oligomer.

The types and levels of the monomers described above may be chosen to provide the multistage polymer particles with a $T_g$ suitable for different applications, for example, in the range of from −25° C. to 40° C., from −10° C. to 35° C., or from 0° C. to 30° C. The multistage polymer particles may have a number average particle size of from 50 nanometers (nm) to 500 nm, from 80 nm to 200 nm, or from 90 nm to 150 nm as determined by Brookhaven BI-90 Particle Size Analyzer. Without being bounded by a theory, the multistage polymer particles may comprise multiple different phases formed by the polymer A, the oligomer, and optionally the polymer B, respectively.

In addition to the multistage polymer particles, the aqueous dispersion of the present invention may further comprise a polyfunctional carboxylic hydrazide containing at least two hydrazide groups per molecule, particularly when the multistage polymer particles comprise structural units of DAAM. The polyfunctional carboxylic hydrazide may act as a crosslinker and may be selected from adipic dihydrazide, oxalic dihydrazide, isophthalic dihydrazide, polyacrylic polyhydrazides, or mixtures thereof. The polyfunctional carboxylic hydrazide may be present in an amount of from zero to 10%, from 0.05% to 7%, or from 0.1% to 5%, by weight based on the weight of the multistage polymer particles.

The aqueous dispersion of the present invention further comprises water. The concentration of water may be, by weight based on the total weight of the aqueous dispersion, from 30% to 90% or from 40% to 80%. The aqueous dispersion of the present invention may be useful in many applications including, for example, wood coatings, architecture coatings, and traffic paints.

The process of preparing the aqueous dispersion of multistage polymer particles may include multistage free-radical polymerization in which at least two stages are formed sequentially, which usually results in the formation of the multistage polymer particles comprising at least two polymer compositions such as the polymer A and the oligomer, optionally the different stages can be formed in different reactors. The multistage free-radical polymerization may include a stage of polymerization forming the oligomer in the presence of a chain transfer agent, a stage of polymerization forming the polymer A, and optionally a stage of polymerization forming the polymer B. In some embodiment, the process of preparing the multistage polymer particles includes the polymerization stage forming the polymer A first (i.e., the first stage) and followed by the polymerization stage of forming the oligomer (i.e., the second stage). In some other embodiments, the multistage free-radical polymerization includes at least three stages formed sequentially, which results in the formation of a multi-stage emulsion polymer comprising the polymer A, the polymer B, and the oligomer. Such multi-stage emulsion polymer may be prepared by a process comprising: the first stage of polymerization to form the polymer A, subsequent the second stage of polymerization to form the polymer B in the presence of the polymer A, followed by the third stage of polymerization to form the oligomer. Each stage of the free-radical polymerization can be conducted by polymerization techniques well known in the art such as emulsion polymerization of the monomers described above. Total concentration of the structural units of monomers for the oligomer, the polymer A, and the polymer B, respectively, is equal to 100%. For each monomer, concentration of the monomer based on the total weight of monomers used in preparing a polymer (e.g., the polymer A) is substantially the same as the concentration of structural units of such monomer based on the total weight of such polymer (e.g., the polymer A). A mixture of the monomers for preparing the polymer A, the oligomer, the polymer B may be added neat or as an emulsion in water; or added in one or more additions or continuously, linearly or nonlinearly, over the reaction period of preparing the oligomer, the polymer A, and the polymer B, respectively, or combinations thereof. Temperature suitable for emulsion polymerization processes may be lower than 100° C., in the range of from 30 to 95° C., or in the range of from 50 to 90° C.

In the multistage free-radical polymerization process, free radical initiators may be used in each stage. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers used for preparing the multistage polymer particles. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the multistage free-radical polymerization process, a surfactant may be used in each stage. The surfactant may be added prior to or during the polymerization of the monomers, or combinations thereof. A portion of the surfactant can also be added after the polymerization. Surfactants may be used for at least one stage or all stages of preparing the multistage polymer particles. These surfactants may include anionic and/or nonionic emulsifiers. The surfactants can be reactive surfactants, e.g., polymerizable surfactants. Examples of suitable surfactants include alkali metal or ammonium salts of alkyl, aryl, or alkylaryl sulfates, sulfonates or phosphates; alkyl sulfonic acids; sulfosuccinate salts; fatty acids; and ethoxylated alcohols or phenols. Preferably, the alkali metal or ammonium salts of alkyl, aryl, or alkylaryl sulfates surfactant are used. The combined amount of the surfactant used is usually from zero to 10% or from 0.5% to 3%, by weight based on the weight of total monomers used for preparing the multistage polymer particles.

In the multistage free-radical polymerization process, a chain transfer agent may be used in each stage, particularly the stage of preparing the oligomer. Examples of suitable chain transfer agents include 3-mercaptopropionic acid, methyl mercaptopropionate, butyl mercaptopropionate, n-Dodecyl mercaptan, benzenethiol, azelaic alkyl mercaptan, or mixtures thereof. The chain transfer agent may be used in an effective amount to control the molecular weight of the resultant oligomer, the polymer A and/or the polymer B. The chain transfer agent used for preparing the oligomer may be present in an amount more than 2%, for example, 2.5% to 6% or 3% to 5%, by weight based on the total weight of monomers used for preparing the oligomer.

In some embodiments, the process of preparing the aqueous dispersion of multistage polymer particles includes first preparing the polymer A in an aqueous medium by a free-radical polymerization in the presence of the surfactant, followed by preparing the oligomer in an aqueous medium by a free-radical polymerization in the presence of the chain transfer agent. In some other embodiments, the process is conducted by first preparing the polymer A in an aqueous medium by a free-radical polymerization in the presence of the surfactant, then preparing the polymer B in the presence of the polymer A, followed by preparing the oligomer by a free-radical polymerization in the presence of the chain transfer agent. The obtained dispersion may be neutralized to a pH value of at least 7. Neutralization may be conducted by adding one or more bases which may lead to partial or complete neutralization of the ionic or latently ionic groups of the multistage polymer particles. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1, 12-diamine, polyethyleneimine or polyvinylamine; aluminum hydroxide; or mixtures thereof. The process of the present invention may further comprise adding the polyfunctional carboxylic hydrazide containing at least two hydrazide groups per molecule described above into the obtained aqueous dispersion of multistage polymer particles.

The aqueous dispersion of multistage polymer particles of the present invention is useful for use in applications where better flow-and-leveling property and longer open time are desirable. Particularly, the aqueous dispersion of multistage polymer particles can provide aqueous coating compositions comprising thereof with both improved flow-and-leveling property and longer open time as compared to incumbent aqueous coating compositions that comprise one-stage polymer comprising structural units of the alkoxylated (meth) acrylate or multistage polymer particles free of the oligomer described above.

The present invention also relates to an aqueous coating composition comprising the aqueous dispersion of multistage polymer particles described above or the aqueous dispersion obtained from the process described above. The aqueous dispersion of multistage polymer particles may be present, by solids weight based on the total solid weight of the aqueous coating composition, in an amount of from 30% to 90%, from 35% to 85%, or from 40% to 75%.

The aqueous coating composition of the present invention may also comprise one or more pigments. As used herein, the term "pigment" refers to a particulate inorganic material which is capable of materially contributing to the opacity or hiding capability of a coating. Such materials typically have a refractive index greater than 1.8. Examples of suitable pigments include titanium dioxide ($TiO_2$), zinc oxide, zinc sulfide, iron oxide, barium sulfate, barium carbonate, or mixtures thereof. The aqueous coating composition may also comprise one or more extenders. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 5% to 50%, from 10% to 50%, or from 15% to 50%. PVC of a coating composition may be determined according to the following equation:

$$PVC = \frac{\text{pigment volume} + \text{extender volume}}{\text{pigment volume} + \text{extender volume} + \text{binder volume}} * 100\%$$

The aqueous coating composition of the present invention may further comprise one or more defoamers. "Defoamers" herein refers to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. The defoamer may be present, by weight based on the total weight of the aqueous coating composition, generally from zero to 3%, from 0.1% to 2%, or from 0.2% to 1%.

The aqueous coating composition of the present invention may further comprise one or more thickeners (also known as "rheology modifiers"). The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferred thickener is based on HEUR. The thickener may be present, by weight based on the total weight of the aqueous coating composition, from zero to 10%, from 0.1% to 6%, or from 0.2% to 4%.

The aqueous coating composition of the present invention may further comprise water. The concentration of water may be, by weight based on the total weight of the aqueous coating composition, from 30% to 90%, from 35% to 80%, or from 40% to 70%.

In addition to the components described above, the aqueous coating composition of the present invention may further comprise any one or combination of the following additives: buffers, neutralizers, dispersants, humectants, biocides, anti-skinning agents, colorants, flowing agents, antioxidants, plasticizers, freeze/thaw additives, leveling agents, thixotropic agents, adhesion promoters, anti-scratch additives, and grind vehicles. These additives may be present in a combined amount of, from zero to 10%, from 0.1% to 6%, or from 0.2% to 4%, by weight based on the total weight of the aqueous coating composition.

The aqueous coating composition of the present invention may comprise conventional open time extenders including, for example, alkylene glycols such as ethylene glycol, propylene glycol and mixtures thereof. The aqueous coating composition can achieve extended open time without or with only a small amount of conventional open time extenders, for example, less than 1%, less than 0.5%, less than 0.1%, or even zero of the conventional open time extenders, by weight based on the total weight of the aqueous coating composition.

The aqueous coating composition of the present invention may have better flow-and-leveling property and extended open time, as compared to coating compositions comprising a one-stage polymer comprising structural units of the alkoxylated (meth)acrylate, or multistage polymer particles without containing the oligomer, as measured in the same way under the same conditions.

The aqueous coating composition of the present invention may be prepared with techniques known in the coating art. The process of preparing the aqueous coating composition may comprise admixing the aqueous dispersion of multistage polymer particles, with other optional components as described above. Components in the aqueous coating composition may be mixed in any order to provide the aqueous coating composition of the present invention. Any of the above-mentioned optional components may also be added to the composition during or prior to the mixing to form the aqueous coating composition.

The aqueous coating composition of the present invention can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition has been applied to a substrate, the aqueous coating composition may be dried, or be allowed to dry, at 5-25° C., or at an elevated temperature, for example, from 25 to 120° C. to form a film (this is, coating).

The aqueous coating composition of the present invention can be applied to, and adhered to, various substrates. Examples of suitable substrates include concrete, cementious substrates, wood, metals, stones, elastomeric substrates, glass or fabrics. The coating composition is suitable for various coating applications, such as architecture coatings, marine and protective coatings, automotive coatings, wood coatings, coil coatings, traffic paints, and civil engineering coatings. The aqueous coating composition can be used alone, or in combination with other coatings to form multi-layer coatings.

EXAMPLES

Some embodiments of the invention will now be described in the following Examples, wherein all parts and percentages are by weight unless otherwise specified. The following materials are used in the examples:

Methyl methacrylate (MMA), 2-Ethylhexyl acrylate (EHA), butyl methacrylate (BMA), and acrylic acid (AA) are all available from Shanghai Lang Yuan Chemical Co., Ltd.

Diacetoneacrylamide (DAAM), methyl mercaptopropionate (MMP), and ammonium persulfate (APS) (97%) used as an initiator are all from Shanghai Chemical Reagent Co., Ltd.

BISOMER S10W Methoxy Polyethyleneglycol Methacrylate ("MPEGMA"), available from GEO Specialty Chemicals UK Ltd., is a 50% aqueous solution of methoxy polyethylene glycol 1000 methacrylate with a molecular weight of about 1080 g/mol.

DISPONIL Fes-32 surfactant ("Fes-32"), available from Cognis, is a sodium salt of fatty alcohol ether sulphate (31% solids).

POLYSTEP P-12-A surfactant ("P-12-A"), available from Stepan, is a polyethylene glycol monotridecyl ether phosphate ammonia salt (25% solids).

Tiona 595 titanium dioxide pigment is available from Millennium.

ACRYSOL™ RM-5000, available from The Dow Chemical Company, is a hydrophobically modified ethoxylated urethane polymer.

ACRYSOL RM-8W, available from The Dow Chemical Company, is a hydrophobically modified ethoxylated urethane polymer.

OROTAN™ 731A Polyacid Copolymer used as a pigment dispersant, PRIMAL™ RM-8W HEUR Thickener, PRIMAL RM-5000 HEUR Thickener, TERGITOL™ 15-S-9 Nonionic surfactant, and AMP-95™ 2-methyl-2-amino-propanol are all available from The Dow Chemical Company (OROTAN, PRIMAL, TERGITOL, and AMP-95 are all trademarks of The Dow Chemical Company).

Rhodafac RS-610 Phosphate Surfactant (25%) is available from Solvay.

Zonyl 9361 fluorosurfactant is available from DuPont.

BYK-022 Silicone defoamer is available from BYK.

Texanol coalescent (Trimethylpentanediol isobutyrate) is available from Eastman.

Acticide EPW biocide, available from THOR Biocides, is 2-octyl-2h-isothiazol-3-one.

The following standard analytical equipment and methods are used in the Examples.

Open Time Test

A sealed cardboard chart was secured to an aluminum drawdown plate in a Controlled Temperature Room (CTR) (approximate 55% relative humility (RH) and 25° C.). A coating composition to be tested were drawn down lengthwise on the charts using a 6 mil drawdown bar (approximate 80 millimeters (mm) wide, and wet coating film thickness around 150 μm). A line was scored by cutting through the freshly coated wet film using the handle tip of a paint brush (38 mm width), and the timer was started. The brush was loaded with the paint formulation to a depth of approximate 2 centimeters (cm) and excess paint was wiped off the underside of the brush. At 1 minute interval, the drawdown was brushed across, attempting to remove the line scored in the paint film, to ensure both edges of the drawdown were brushed over. A set number of brush strokes (10 strokes are typically used) was maintained and the pressure on all the brushes of a set was the same. The brush was reloaded as described above at each interval. Typically the brushing can be repeated for 7-8 minutes on the chart of the size specified above. If the coating is still able to be repaired after 7-8 minutes, the test was repeated using 2 minute intervals. The coated charts were allowed to dry for 24 hours in the CTR before rating. The dried paint on the coated charts was visually inspected to determine the time at which the scored line is no longer visible to the naked eye. These dried coated charts were then used to evaluate the flow-and-leveling property of the coating composition described below.

Flow-and-Leveling Property Test

The flow-and-leveling property of a coating composition was evaluated by the naked eye according to the appearance of brush marks. Film panels used for determining the flow-and-leveling property were those dried coated charts used above for evaluating the open time of such coating composition. The brush marks level is listed in the table below, wherein 10 stands for "best" and 1 stands for "worst". The less obvious the brush marks the better the flow-and-leveling property.

| Flow-and-leveling level | State |
| --- | --- |
| 10 | No brush mark observed. The film observation is smooth. |
| 8 | Very slight brush mark observed. The mark edge is smooth. |
| 7 | Slight brush mark observed but worse than 8. The mark edge is smooth. |
| 6 | The brush mark is obvious. The mark edge is smooth. |
| 5 | The brush mark is obvious. The mark edge is clear. |
| 4 | Very obvious brush mark. The mark edge is sharp (no diffuse of the edge). |
| 2 | Very obvious brush mark. Mark edge is sharp and the mark depth is higher than 4. |
| 1 | Brush mark is obvious. No diffuse at the edge. Substrate is leaked. |

GPC Analysis

The molecular weight of a sample was measured by GPC analysis using an Agilent 1200. The sample was dissolved in 30 mL of tetrahydrofuran (THF)/formic acid (FA) (95:5 volume/volume) with a concentration of 2 mg/mL, stirred for over 1 hour and left overnight, and then filtered through 0.45 μm polytetrafluoroethylene (PTFE) filter prior to the GPC analysis. The GPC analysis was conducted using the following instrumental conditions:

Columns: One PLgel GUARD columns (10 μm, 50×7.5 mm) (132 #), two Mixed B columns (7.8×300 mm) in tandem (114 #, 115 #); column temperature: 40° C.; mobile phase: THF/FA (5%); flow rate: 1.0 mL/min; injection volume: 100 μL; detector: Agilent Refractive Index detector, 40° C.; and calibration curve: PL Polystyrene 1 Narrow standards with molecular weights ranging from 2329000 to 580 g/mol, using polynom 3 fitness.

Ex 1 Aqueous Dispersion of Multistage Emulsion Polymers (3-Stage Process)

Three monomer emulsions, ME #1, ME #2 and ME #3, respectively, were prepared under magnetic stirring based on the following formulations, ME #1: $H_2O$ (341.15 g), P-12-A (37.50 g), AA (16.14 g), EHA (389.32 g), and MMA (404.32 g); ME #2: $H_2O$ (191.67 g), P-12-A (33.75 g), AA (17.89 g), EHA (123.11 g) and MMA (380.70 g); and ME #3: $H_2O$ (25.00 g), P-12-A (8.33 g), BMA (88.83 g), MPEGMA (114.50 g) and MMP (4.54 g).

Into a 1 gallon vessel, equipped with a reflux condenser, addition funnels and a stirrer, an initial water charge was added with agitation. The reaction vessel was heated to 86° C., and then FES-32 (8.75 g) was added into the vessel. ME #1 (56.00 g) and an initial catalyst solution (5.32 g of APS in 20.00 g of water) were charged into the reaction vessel. Then the remainder of ME #1 and a catalyst solution (2.88 g of APS in 72.00 g of water) were added over a period of time. After completing addition of ME #1 and ME #2 together with the remainder of the catalyst solution were added over another period of time. After completing addition of ME #2 and ME #3 together with another catalyst solution (0.93 g of APS in 10.00 g of water) were added. The reaction was carried out at 84-86° C. and the overall time for the reaction was around 180 minutes. When all the feedings were completed, the contents in the reaction vessel were cooled to room temperature. Ammonia (25%) was added to adjust the pH of the obtained dispersion.

Ex 2 Aqueous Dispersion of Multistage Emulsion Polymers (3-Stage Process)

The aqueous dispersion of Ex 2 was prepared according to the same procedure as described in Ex 1 above, except that ME #1, ME #2 and ME #3, respectively, were prepared based on the following formulations, ME #1: $H_2O$ (409.37 g), P-12-A (45.00 g), AA (19.37 g), EHA (467.18 g), MMA (485.19 g) and DAAM (36.00 g); ME #2: $H_2O$ (230.00 g), P-12-A (40.50 g), AA (21.46 g), EHA (147.73 g) and MMA (456.84 g); and ME #3: $H_2O$ (20.00 g), P-12-A (10.00 g), BMA (105.32 g), MPEGMA (137.12 g) and MMP (5.45 g).

Ex 3 Aqueous Dispersion of Multistage Emulsion Polymers (2-Stage Process)

Two monomer emulsions, ME #1 and ME #2, respectively, were prepared under magnetic stirring based on s the following formulations, ME #1: $H_2O$ (532.81 g), P-12-A (71.25 g), AA (34.03 g), EHA (512.43 g), MMA (785.02 g) and DAAM (30.00 g); and ME #2: $H_2O$ (25.00 g), P-12-A (8.33 g), BMA (88.83 g), MPEGMA (114.50 g) and MMP (4.54 g).

Into a 1 gallon vessel, equipped with a reflux condenser, addition funnels and a stirrer, an initial water charge was added with agitation. The reaction vessel was heated to 86° C., and then FES-32 (8.75 g) was added into the vessel. ME #1 (92.40 g) and an initial catalyst solution (5.32 g of APS in 15.00 g water) were charged into the reaction vessel. Then the remainder of ME #1 and a catalyst solution (2.88 g of APS in 72.00 g of water) were added over a period of time. After completing addition of ME #1 and ME #2 together with another catalyst solution (0.93 g of APS in 8.83 g of water) were added. The reaction was carried out at 84-86° C. and the overall time for the reaction was around 180 minutes. When all the feedings were completed, the contents in the reaction vessel were cooled to room temperature. Ammonia (25%) was added to adjust the pH of the obtained dispersion.

Ex 4 Aqueous Dispersion of Multistage Emulsion Polymers (3-Stage Process)

Three monomer emulsions, ME #1, ME #2 and ME #3, respectively, were prepared under magnetic stirring based on the following formulations, ME #1: $H_2O$ (409.37 g), P-12-A (45.00 g), AA (19.37 g), EHA (467.18 g), MMA (485.19 g) and DAAM (36.00 g); ME #2: $H_2O$ (230.00 g), P-12-A (40.50 g), AA (21.46 g), EHA (147.73 g) and MMA (456.84 g); and ME #3: $H_2O$ (9.13 g), P-12-A (5.07 g), BMA (52.29 g), MPEGMA (68.23 g) and MMP (2.76 g).

Into a 1 gallon vessel, equipped with a reflux condenser, addition funnels and a stirrer, an initial water charge was added with agitation. The reaction vessel was heated to 86° C. FES-32 (10.5 g) was added into the vessel. ME #1 (67.10 g) and an initial catalyst solution (6.38 g of APS in 18.00 g of water) were charged into the reaction vessel. Then the remainder of ME #1 and a catalyst solution (3.46 g of APS in 86.40 g of water) were added over a period of time. After completing addition of ME #1 and ME #2 together with the remainder of the catalyst solution were added over another period of time. After completing addition of ME #2 and ME #3 together with another catalyst solution (0.57 g of APS in 5.38 g of water) were added. The reaction was carried out at 84-86° C. and the overall time for the reaction was around 170 minutes. When all the feedings were completed, the contents in the reaction vessel were cooled to room temperature. Ammonia (25%) was added to adjust the pH of the obtained dispersion.

Ex 5 Aqueous Dispersion of Multistage Emulsion Polymers (3-Stage Process)

Three monomer emulsions, ME #1, ME #2 and ME #3, respectively, were prepared under magnetic stirring based on the following formulations, ME #1: $H_2O$ (409.37 g), P-12-A (45.00 g), AA (19.37 g), EHA (467.18 g), MMA (485.19 g) and DAAM (36.00 g); ME #2: $H_2O$ (230.00 g), P-12-A (40.50 g), AA (21.46 g), EHA (147.73 g) and MMA (456.84 g); and ME #3: $H_2O$ (30.44 g), P-12-A (16.91 g), BMA (175.34 g), MPEGMA (228.78 g) and MMP (9.21 g).

Into a 1 gallon vessel, equipped with a reflux condenser, addition funnels and a stirrer, an initial water charge was added with agitation. The reaction vessel was heated to 86° C. FES-32 (10.5 g) was added into the vessel. ME #1 (67.10 g) and an initial catalyst solution (6.38 g of APS in 18.00 g water) were charged into the reaction vessel. Then the remainder of ME #1 and a catalyst solution (3.46 g of APS in 86.40 g of water) were added over a period of time. After completing addition of ME #1 and ME #2 together with the remainder of the catalyst solution were added over another period of time. After completing addition of ME #2 and ME #3 together with another catalyst solution (1.89 g of APS in 17.93 g of water) were added. The reaction was carried out at 84-86° C. and the overall time for the reaction was around 200 minutes. When all the feedings were completed, the contents in the reaction vessel were cooled to room temperature. Ammonia (25%) was added to adjust the pH of the obtained dispersion.

Comparative (Comp) Ex A Multistage Emulsion Polymer Dispersion (3-Stage Process)

Three monomer emulsions, ME #1, ME #2 and ME #3, respectively, were prepared under magnetic stirring based on the following formulations, ME #1: $H_2O$ (341.15 g), P-12-A (37.50 g), AA (16.14 g), EHA (389.32 g) and MMA (429.32 g); ME #2: $H_2O$ (191.67 g), P-12-A (33.75 g), AA (17.89 g), EHA (123.11 g) and MMA (380.70 g); and ME #3: $H_2O$ (50.00 g), P-12-A (8.33 g), BMA (144.94 g) and MMP (4.54 g).

Into a 1 gallon vessel, equipped with a reflux condenser, addition funnels and a stirrer, an initial water charge was added with agitation. The reaction vessel was heated to 86° C. FES-32 (8.75 g) was added into the vessel. ME #1 (57.2 g) and an initial catalyst solution (5.32 g of APS in 20.00 g water) were charged into the reaction vessel. Then the remainder of ME #1 and a catalyst solution (2.88 g of APS in 72.00 g of water) were added over a period of time. After completing addition of ME #1 and ME #2 together with the remainder of the catalyst solution were added over another period of time. After completing addition of ME #2 and ME #3 together with another catalyst solution (0.93 g of APS in 10.00 g of water) were added. The reaction was carried out at 84-86° C. and the overall time for the reaction was around 180 minutes. When all the feedings were completed, the contents in the reaction vessel were cooled to room temperature. Ammonia (25%) was added to adjust the pH of the obtained dispersion.

Comp Ex B Multistage Emulsion Polymer Dispersion (3-stage process)

The Multistage emulsion polymer of Comp Ex B was prepared according to the same procedure as described in Comp Ex A above, except that ME #1, ME #2 and ME #3, respectively, were prepared based on the following formulations, ME #1: $H_2O$ (341.15 g), P-12-A (37.50 g), AA (16.14 g), EHA (389.32 g), MMA (404.32 g) and DAAM (30.00 g); ME #2: $H_2O$ (191.67 g), P-12-A (33.75 g), AA (17.89 g), EHA (123.11 g) and MMA (380.70 g); and ME #3: $H_2O$ (50.00 g), P-12-A (8.33 g), BMA (144.98 g) and MMP (4.54 g).

Comp Ex C One-stage Emulsion Polymer Dispersion

A monomer emulsion (ME) comprising $H_2O$ (589.70 g), P-12-A (78.86 g), AA (37.66 g), EHA (567.14 g), MMA (868.85 g) and DAAM (33.29 g) was prepared under magnetic stirring. Into a 1 gallon vessel, equipped with a reflux condenser, addition funnels and a stirrer, an initial water charge was added with agitation. The reaction vessel was heated to 86° C. FES-32 (8.75 g) was added into the vessel. ME (102.26 g) and an initial catalyst solution (5.89 g of APS in 16.60 g of water) were charged into the reaction vessel. Then the remainder of ME and a catalyst solution (3.19 g of APS in 79.69 g of water) were added over a period of time. The reaction was carried out at 84-86° C. and the overall time for the reaction was around 150 minutes. When all the feedings were completed, the contents in the reaction vessel were cooled to room temperature. Ammonia (25%) was added to adjust the pH of the obtained dispersion.

Comp Ex D Multistage Emulsion Polymer Dispersion (2-stage process)

Two monomer emulsions, ME #1 and ME #2, respectively, were prepared under magnetic stirring based on the following formulations, ME #1: $H_2O$ (454.00 g), P-12-A (49.90 g), AA (21.48 g), EHA (513.11 g), MMA (541.07 g) and DAAM (37.50 g); and ME #2: $H_2O$ (255.07 g), P-12-A (44.91 g), AA (23.80 g), EHA (163.83 g) and MMA (506.64 g).

Into a 1 gallon vessel, equipped with a reflux condenser, addition funnels and a stirrer, an initial water charge was added with agitation. The reaction vessel was heated to 86° C. FES-32 (10.50 g) was added into the vessel. ME #1 (76.2 g) and an initial catalyst solution (7.08 g of APS in 19.96 g water) were charged into the reaction vessel. Then the remainder of ME #1 and a catalyst solution (3.83 g of APS in 95.82 g of water) were added over a period of time. After completing addition of ME #1 and ME #2 was added over another period of time. The reaction was carried out at 84-86° C. and the overall time for the reaction was around 150 minutes. When all the feedings were completed, the contents in the reaction vessel were cooled to room temperature. Ammonia (25%) was added to adjust the pH of the obtained dispersion.

Comp Ex E Emulsion Polymer Blend

The aqueous dispersion of Comp Ex E was prepared by cold blending the aqueous dispersion prepared above in Comp Ex D with an oligomer dispersion (OD1) at a solid weight ratio of 9:1. The OD1 used herein was prepared as follows, A monomer emulsion (ME) was prepared by mixing $H_2O$ (37.59 g), P-12-A (12.53 g), BMA (133.56 g), MPEGMA (172.15 g) and MMP (6.83 g) under magnetic stirring.

Into a 1 L vessel, equipped with a reflux condenser, addition funnels and a stirrer, an initial water charge was added with agitation. The reaction vessel was heated to 86° C. FES-32 (8.42 g) was added into the vessel. ME (16.35 g) and an initial catalyst solution (0.68 g of APS in 9.60 g water) were charged into the reaction vessel. Then the remainder of ME and another catalyst solution (0.68 g of APS in 12.72 g of water) were added over a period of time. The reaction was carried out at 84-86° C. and the overall time for the reaction was around 90 minutes. When all the feedings were completed, the contents in the reaction vessel were cooled to room temperature. Ammonia (25%) was added to adjust the pH of the obtained dispersion to 8.63. The obtained oligomer dispersion had a viscosity of 32 centipoises (cps), an average particle size of 71 nanometers (nm), and solids content of 35.43%, where the oligomer (62.5BMA/37.5MPEGMA, % by weight based on the oligomer weight) had a weight average molecular weight of 15,505 g/mol as measured by GPC analysis.

Comp Ex F Multistage Emulsion Polymer Dispersion (3-stage process)

Three monomer emulsions, ME #1, ME #2 and ME #3, respectively, were prepared under magnetic stirring using the following formulations, ME #1: $H_2O$ (341.15 g), P-12-A (37.50 g), AA (16.14 g), EHA (389.32 g), MMA (404.32 g), and DAAM (30.00 g); ME #2: $H_2O$ (191.67 g), P-12-A (33.75 g), AA (17.89 g), EHA (123.11 g), and MMA (380.70 g); and ME #3: $H_2O$ (25.00 g), P-12-A (8.33 g), BMA (88.83 g), and MPEGMA (114.50 g).

Into a 1 gallon vessel, equipped with a reflux condenser, addition funnels and a stirrer, an initial water charge was added with agitation. The reaction vessel was heated to 86° C. FES-32 (8.75 g) was added into the vessel. ME #1 (57.40 g) and an initial catalyst solution (5.32 g of APS in 15.00 g water) were charged into the reaction vessel. Then the remainder of ME #1 and a catalyst solution (2.88 g of APS in 72.00 g of water) were added over a period of time. After completing addition of ME #1 and ME #2 together with the remainder of the catalyst solution were added over another period of time. After completing addition of ME #2 and ME #3 together with another catalyst solution (0.93 g of APS in 10.00 g of water) were added. The reaction was carried out at 84-86° C. and the overall time for the reaction was around 180 minutes. When all the feedings were completed, the contents in the reaction vessel were cooled to room temperature. Ammonia (25%) was added to adjust the pH of the obtained dispersion.

Comp Ex G One-stage Emulsion Polymer Dispersion

A monomer emulsion (ME) was prepared by mixing $H_2O$ (669.37 g), P-12-A (95.5 g), AA (40.83 g), EHA (614.91 g), MMA (942.03 g), BMA (106.60 g), DAAM (36.00 g), MPEGMA (137.40 g) and MMP (5.45 g) under magnetic stirring.

Into a 1 gallon vessel, equipped with a reflux condenser, addition funnels and a stirrer, an initial water charge was added with agitation. The reaction vessel was heated to 86° C. FES-32 (15.75 g) was added into the vessel. ME (124.46 g) and an initial catalyst solution (6.38 g of APS in 18.00 g of water) were charged into the reaction vessel. Then the remainder of ME and a catalyst solution (4.57 g of APS in 97.00 g of water) were added over a period of time. The reaction was carried out at 84-86° C. and the overall time for the reaction was around 150 minutes. When all the feedings were completed, the contents in the reaction vessel were cooled to room temperature. Ammonia (25%) was added to adjust the pH of the obtained dispersion.

Comp Ex H Multistage Emulsion Polymer Dispersion (3-stage process)

Three monomer emulsions, ME #1, ME #2 and ME #3, were prepared under magnetic stirring, respectively, based on the following formulations:

ME #1: $H_2O$ (409.37 g), P-12-A (45.00 g), AA (19.37 g), EHA (467.18 g), MMA (485.19 g) and DAAM (36.00 g); ME #2: $H_2O$ (230.00 g), P-12-A (40.50 g), AA (21.46 g), EHA (147.73 g) and MMA (456.84 g); and ME #3: $H_2O$ (1.74 g), P-12-A (0.97 g), BMA (10.04 g), MPEGMA (13.09 g) and MMP (0.53 g).

Into a 1 gallon vessel, equipped with a reflux condenser, addition funnels and a stirrer, an initial water charge was added with agitation. The reaction vessel was heated to 86° C. FES-32 (10.5 g) was added into the vessel. ME #1 (67.10 g) and an initial catalyst solution (6.38 g of APS in 18.00 g water) were charged into the reaction vessel. Then the remainder of ME #1 and a catalyst solution (3.46 g of APS in 86.40 g of water) were added over a period of time. After completing addition of ME #1 and ME #2 together with the remainder of the catalyst solution were added over another period of time. After completing addition of ME #2 and ME #3 together with another catalyst solution (0.11 g of APS in 1.02 g of water) were added. The reaction was carried out at 84-86° C. and the overall time for the reaction was around 160 minutes. When all the feedings were completed, the contents in the reaction vessel were cooled to room temperature. Ammonia (25%) was added to adjust the pH of the obtained dispersion.

Tables 1 and 2 give composition and properties of the polymer dispersions obtained above. Morphology of polymer particles in the aqueous dispersions of Ex 2 and Comp Exs D and E, and in the oligomer dispersion (OD1) used in Comp Ex E.

TABLE 1

Composition of emulsion polymers (binders)

| Examples | Emulsion Polymer Composition* |
|---|---|
| Ex 1 | 54.7% polymer A (48.0EHA/50.0MMA/2AA)//35.3% polymer B (23.5EHA/73.0MMA/3.5AA)// 10.0% oligomer (61.0BMA/39.0MPEGMA) |
| Ex 2 | 55.7% polymer A (46.3EHA/48.1MMA/3.6DAAM/2AA)// 34.6% polymer B (23.5EHA/73.0MMA/3.5AA)// 9.7% oligomer (61.0BMA/39.0MPEGMA) |
| Ex 3 | 90.2% polymer A (57.7EHA/37.6MMA/2.2DAAM)// 9.8% oligomer (61.3BMA/38.7MPEGMA) |
| Ex 4 | 58.58% polymer A (46.3EHA/48.1MMA/3.6DAAM/2AA)// 36.42% polymer B (23.5EHA/73.0MMA/3.5AA)// 5.00% oligomer (61.0BMA/39.0MPEGMA) |
| Ex 5 | 52.42% polymer A (46.3EHA/48.1MMA/3.6DAAM/2AA)// 32.58% polymer B (23.5EHA/73.0MMA/3.5AA)// 15.00 % oligomer (61.0BMA/39.0MPEGMA) |
| Comp Ex A | 55.7% polymer A (46.5EHA/51.5MMA/2AA)// 34.6% polymer B (23.5EHA/73.0MMA/3.5AA)// 9.7% oligomer (100.0BMA) |
| Comp Ex B | 55.7% polymer A (46.3EHA/48.1MMA/3.6DAAM/2AA)// 34.6% polymer B (23.5EHA/73.0MMA/3.5AA)// 9.7% oligomer (100.0BMA) |
| Comp Ex C | 37.6EHA/57.7MMA/2.2DAAM/2.5AA |
| Comp Ex D | 61.5% polymer A (46.0EHA/48.7MMA/3.3DAAM/2AA)// 38.5% polymer B (23.5EHA/73.0MMA/3.5AA) |
| Comp Ex E | Blend of polymer dispersion of Comp Ex D with OD1 (solids weight ratio: 9:1) |
| Comp Ex F | 55.7% polymer A (46.3EHA/48.1MMA/3.6DAAM/2AA)// 34.6% polymer B (23.5EHA/73.0MMA/3.5AA)// 9.7% stage 3 polymer (61.0BMA/39.0MPEGMA) |
| Comp Ex G | 33.9EHA/52.2MMA/2DAAM/ 2.3AA/5.9BMA/3.7MPEGMA |
| Comp Ex H | 61.05% polymer A (46.3EHA/48.1MMA/3.6DAAM/2AA)// 37.95% polymer B (23.5EHA/73.0MMA/3.5AA)// 1.00% oligomer (61.0BMA/39.0MPEGMA) |

*the first-stage polymer (% by weight based on the total weight of monomers in stage 1)//the second-stage polymer (% by weight based on the total weight of monomers in stage 2)//the third-stage polymer (% by weight based on the total weight of monomers in stage 3);
% values of each stage refers to weight percentage values based on the total weight of the emulsion polymer.

TABLE 2

Physical properties of dispersions of emulsion polymers (binders)

| Examples | pH | Viscosity[1]/ cps | Particle size[2]/nm | Solid %, by weight | Weight average molecular weight[3] |
|---|---|---|---|---|---|
| Ex 1 | 7.67 | 68 | 141 | 46.25 | 143,260 g/mol |
| Ex 2 | 7.52 | 133 | 129 | 47.73 | 96,313 g/mol |
| Ex 3 | 7.43 | 429 | 185 | 48.21 | 157,610 g/mol |
| Ex 4 | 7.77 | 205 | 113 | 46.00 | NA |
| Ex 5 | 7.81 | 213 | 122 | 47.26 | NA |
| Comp Ex A | 7.66 | 235 | 108 | 47.22 | NA |
| Comp Ex B | 7.89 | 192 | 106 | 46.53 | NA |
| Comp Ex C | 7.74 | 600 | 116 | 48.87 | NA |
| Comp Ex D | 7.53 | 445 | 107 | 48.78 | 133,092 g/mol |
| Comp Ex E | 7.35 | 80 | 107 | 47.00 | NA |
| Comp Ex F | 7.64 | 1292 | 146 | 47.77 | NA |
| Comp Ex G | 7.37 | 4100 | 154 | 47.74 | NA |
| Comp Ex H | 7.74 | 214 | 108 | 45.89 | NA |

[1]Viscosity was measured by BROOK FIELD LVDV-1 Prime viscosity detector;
[2]Particle size herein refers to the number average particle size as determined by Brookhaven BI-90 Particle Size Analyzer; and
[3]Molecular weight was measured by GPC.

Paint Formulations

The paint formulations of IP-1 to IP-5 and CP-1 to CP-8 comprising aqueous polymer dispersions obtained above as binders were prepared based on formulations described in Tables 3-1 and 3-2. Ingredients of the grind were mixed using a conventional lab mixer. The binder was added into the grind. Then other ingredients of the letdown were added into the resultant mixture. The obtained coating compositions were evaluated according to the test methods described above and results of properties are shown in Tables 4-7.

TABLE 3-1

Paint Formulations

| Ingredients, kg Grind | IP-1 | IP-2* | IP-3 | IP-4 | IP-5 |
|---|---|---|---|---|---|
| Binder type | Ex 1 | Ex 2 | Ex 3 | Ex 4 | Ex 5 |
| Water | 18.1 | 18.1 | 18.1 | 18.1 | 18.1 |
| OROTAN 731A | 4.8 | 4.8 | 4.8 | 4.8 | 4.8 |
| TERGITOL 15-S-9 | 0.6 | 0.6 | 0.6 | 0.6 | 0.6 |
| BYK-022 | 0.6 | 0.6 | 0.6 | 0.6 | 0.6 |
| AMP-95 | 0.6 | 0.6 | 0.6 | 0.6 | 0.6 |
| Tiona 595 | 114.5 | 114.5 | 114.5 | 114.5 | 114.5 |
| Acticide EPW | 0.8 | 0.8 | 0.8 | 0.8 | 0.8 |
| ACRYSOL RM-5000 | 2 | 2 | 2 | 2 | 2 |
| Water | 8 | 8 | 8 | 8 | 8 |
| Grind Sub-Total | 150 | 150 | 150 | 150 | 150 |
| Binder | 303.1 | 294.2 | 291.2 | 305.1 | 296.7 |

TABLE 3-1-continued

Paint Formulations

| Ingredients, kg Grind | IP-1 | IP-2* | IP-3 | IP-4 | IP-5 |
|---|---|---|---|---|---|
| Binder type | Ex 1 | Ex 2 | Ex 3 | Ex 4 | Ex 5 |
| Propylene glycol | 16 | 16 | 16 | 16 | 16 |
| ACRYSOL RM-5000 | 4 | 4 | 4 | 4 | 4 |
| Texanol ester alcohol | 10 | 10 | 10 | 10 | 10 |
| Rhodafac RS-610 25% | 4 | 4 | 4 | 4 | 4 |
| Zonyl 9361 | 0.8 | 0.8 | 0.8 | 0.8 | 0.8 |
| ACRYSOL RM-8W | 1.9 | 1.7 | 0 | 1.6 | 1.7 |
| AMP-95 | 0 | 0 | 0 | 0 | 0 |
| Adipic dihydrazide | 0 | 1.4 | 1.4 | 1.5 | 1.3 |
| Water | 10.3 | 18.0 | 22.7 | 7.0 | 15.6 |
| Total | 500.1 | 500.1 | 500.0 | 500.0 | 500.1 |

*The IP-2 formulation was tested and compared with comparative paint formulations in Groups I, II, III, and IV, and denoted as IP-2$^I$, IP-2$^{II}$, IP-2$^{III}$, and IP-2$^{IV}$, respectively.

TABLE 3-2

Comparative Paint Formulations

| Ingredients, kg | CP-1 | CP-2 | CP-3 | CP-4 | CP-5 | CP-6 | CP-7 | CP-8 |
|---|---|---|---|---|---|---|---|---|
| Grind Binder type | Comp Ex A | Comp Ex B | Comp Ex C | Comp Ex D | Comp Ex E | Comp Ex F | Comp Ex G | Comp Ex H |
| Water | 18.1 | 18.1 | 18.1 | 18.1 | 18.1 | 18.1 | 18.1 | 18.1 |
| OROTAN 731A | 4.8 | 4.8 | 4.8 | 4.8 | 4.8 | 4.8 | 4.8 | 4.8 |
| TERGITOL 15-S-9 | 0.6 | 0.6 | 0.6 | 0.6 | 0.6 | 0.6 | 0.6 | 0.6 |
| BYK-022 | 0.6 | 0.6 | 0.6 | 0.6 | 0.6 | 0.6 | 0.6 | 0.6 |
| AMP-95 | 0.6 | 0.6 | 0.6 | 0.6 | 0.6 | 0.6 | 0.6 | 0.6 |
| Tiona 595 | 114.5 | 114.5 | 114.5 | 114.5 | 114.5 | 114.5 | 114.5 | 114.5 |
| Acticide EPW | 0.8 | 0.8 | 0.8 | 0.8 | 0.8 | 0.8 | 0.8 | 0.8 |
| ACRYSOL RM-5000 | 2 | 2 | 2 | 2 | 2 | 2 | 2 | 2 |
| Water | 8 | 8 | 8 | 8 | 8 | 8 | 8 | 8 |
| Grind Sub-Total | 150 | 150 | 150 | 150 | 150 | 150 | 150 | 150 |
| Binder | 297.3 | 301.8 | 287.6 | 287.6 | 298.6 | 293.6 | 294.2 | 305.7 |
| Propylene glycol | 16 | 16 | 16 | 16 | 16 | 16 | 16 | 16 |
| ACRYSOL RM-5000 | 4 | 4 | 4 | 4 | 4 | 4 | 4 | 4 |
| Texanol ester alcohol | 10 | 10 | 10 | 10 | 10 | 10 | 10 | 10 |
| RHODAFAC RS-610 | 4 | 4 | 4 | 4 | 4 | 4 | 4 | 4 |
| Zonyl 9361 | 0.8 | 0.8 | 0.8 | 0.8 | 0.8 | 0.8 | 0.8 | 0.8 |
| ACRYSOL RM-8W | 0 | 0.7 | 0 | 1.9 | 0.7 | 1.7 | 0 | 0.8 |
| AMP-95 | 0 | 0 | 0 | 0 | 0 | 0 | 0 | 0 |
| Adipic dihydrazide | 0.0 | 1.4 | 1.5 | 1.4 | 1.3 | 1.4 | 1.4 | 1.5 |
| Water | 17.9 | 11.3 | 26.1 | 24.3 | 15.0 | 18.5 | 20.0 | 7.2 |
| Total | 500.0 | 500.0 | 500.0 | 500.0 | 500.4 | 500.0 | 500.4 | 500.1 |

Paint Formulations Group I

As show in Table 4, the aqueous dispersion of multistage polymer particles including an oligomer stage comprising structural units of MPEGMA provided paint formulations comprising thereof with better flow-and-leveling property and extended open time (IP-1 and IP-2$^I$), as compared to comparative multistage polymer particles comprising a oligomer free of structural units of MPEGMA in the paint formulations of CP-1 and CP-2.

TABLE 4

Properties of Paint Formulations Group I

| Paint ID | IP-1 | IP-2$^I$ | CP-1 | CP-2 |
|---|---|---|---|---|
| Binder | Ex 1 | Ex 2 | Comp Ex A | Comp Ex B |
| Flow-and-leveling property | 9 | 9 | 7 | 7 |
| Open time (mins) | 6.2 | 4.8 | 4.3 | 4.2 |

Paint Formulations Group II

As shown in Table 5, the paint formulations of the present invention (IP-3 and IP-2$^{II}$) also showed both good flow-and-leveling property and extended open time, as compared to the comparative paint formulations (CP-3 and CP-4) comprising the binders of Comp Exs C and D, respectively. The binder of Comp Ex C was prepared by one-stage process and the binder of Comp Ex D was prepared by two-stage process but no MPEGMA-containing oligomer stage involved.

TABLE 5

Properties of Paint Formulations Group II

| Paint ID | CP-3 | IP-3 | CP-4 | IP-2$^{II}$ |
|---|---|---|---|---|
| Binder | Comp Ex C | Ex 3 | Comp Ex D | Ex 2 |
| Flow-and-leveling property | 4.0 | 6.0 | 6.5 | 8.0 |
| Open time (mins) | 4.8 | 5.4 | 3.8 | 4.4 |

Paint Formulations Group III

As shown in Table 6, the paint formulation of CP-5 comprising the cold blended binder showed poor flow-and-leveling although acceptable open time, as compared to the paint formulation of IP-2$^{III}$. The paint formulation of IP-2$^{III}$ also demonstrated better flow-and-leveling properties and extended open time, as compared to the paint formulations comprising the oligomer-free multistage polymer binder (CP-6) and the one-stage polymer binder (CP-7).

TABLE 6

Properties of Paint Formulations Group III

| Paint ID | IP-2$^{III}$ | CP-5 | CP-6 | CP-7 |
|---|---|---|---|---|
| Binder | Ex 2 | Comp Ex E | Comp Ex F | Comp Ex G |
| Flow-and-leveling property | 7.5 | 5.5 | 4.0 | 1.0 |
| Open time (mins) | 5.9 | 6.5 | 4.5 | 3.0 |

Paint Formulations Group IV

As shown in Table 7, the binders of Comp Ex H, Ex 4 and Ex 5 were prepared according to the same procedure as Ex 2 except that the concentration of the oligomer comprising structural units of MPEGMA, based on the total weight of the multistage polymer particles, was 1.0%, 5.0% and 15.0%, respectively. The paint formulations comprising the binders with 5.0% to 15.0% of oligomers (IP-4, IP-2$^{IV}$ and IP-5) showed both better flow-and-leveling property and extended open time, as compared to the paint formulation CP-7 comprising the binder with 1.0% of the oligomer (Comp Ex H).

TABLE 7

| Properties of Paint Formulations Group IV | | | | |
|---|---|---|---|---|
| Paint ID | CP-7 | IP-4 | IP-2$^{IV}$ | IP-5 |
| Binder | Comp Ex H | Ex 4 | Ex 2 | Ex 5 |
| Oligomer ratio in binder (%) | 1% | 5% | 10% | 15% |
| Open time (mins) | 4 | 5 | 6 | 5 |
| Flow-and-leveling property | 4 | 8.5 | 8 | 9.5 |

What is claimed is:

1. An aqueous dispersion of multistage polymer particles comprising: an oligomer, a polymer A, and optionally a polymer B; wherein the oligomer has a weight average molecular weight of from 1,000 to 50,000 g/mol and comprises by weight based on the weight of the oligomer:
from 50% to 95% structural units of an ethylenically unsaturated nonionic monomer, and
from 5% to 50% structural units of an alkoxylated (meth) acrylate having the structure of formula (I),

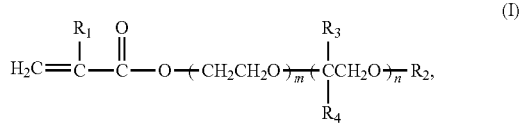

wherein $R_1$ is H or $CH_3$, $R_2$ is H or a $C_1$-$C_6$ alkyl group, $R_3$ and $R_4$ are each independently H or $CH_3$, m is an integer of from 4 to 50, and n is an integer of from 0 to 6;
wherein the multistage polymer particles comprise more than 1% and less than or equal to 30% of the oligomer, by weight based on the weight of the multistage polymer particles.

2. The aqueous dispersion of claim 1, wherein n in formula (I) is 0.

3. The aqueous dispersion of claim 1, wherein the polymer A and the polymer B each independently comprise: structural units of an ethylenically unsaturated nonionic monomer and structural units of an ethylenically unsaturated ionic monomer.

4. The aqueous dispersion of claim 3, wherein the ethylenically unsaturated nonionic monomer is an alkyl ester of (meth)acrylic acid.

5. The aqueous dispersion of claim 1, wherein the polymer A and the polymer B each independently comprise structural units of a carbonyl-containing functional monomer.

6. The aqueous dispersion of claim 5, further comprising a polyfunctional carboxylic hydrazide containing at least two hydrazide groups per molecule.

7. The aqueous dispersion of claim 1, wherein the multistage polymer particles comprise, by weight based on the weight of the multistage polymer particles, from 3% to 20% of the oligomer.

8. The aqueous dispersion of claim 1, wherein the oligomer has a weight average molecular weight of from 5,000 to 20,000 g/mol.

9. The aqueous dispersion of claim 1, wherein m in formula (I) is an integer of from 10 to 50.

10. The aqueous dispersion of claim 1, wherein
the multistage polymer particles comprise, by weight based on the weight of the multistage polymer particles, from 5% to 15% of the oligomer.

11. An aqueous coating composition comprising the aqueous dispersion of claim 1.

12. A process of preparing an aqueous dispersion of multistage polymer particles by multistage free-radical polymerization, comprising:
at least one stage of polymerization forming a polymer A,
at least one stage of polymerization forming an oligomer in the presence of a chain transfer agent, and
optionally at least one stage of polymerization forming a polymer B; wherein the oligomer has a weight average molecular weight of from 1,000 to 50,000 g/mol and comprises by weight based on the weight of the oligomer:
from 50% to 95% structural units of an ethylenically unsaturated nonionic monomer, and
from 5% to 50% structural units of an alkoxylated (meth)acrylate having the structure of formula I,

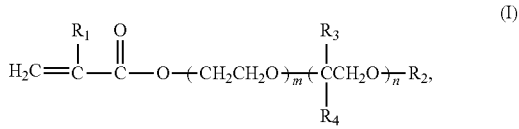

wherein $R_1$ is H or $CH_3$, $R_2$ is H or a $C_1$-$C_6$ alkyl group, $R_3$ and $R_4$ are each independently H or $CH_3$, m is an integer of from 4 to 50, and n is an integer of from 0 to 6;
wherein the multistage polymer particles comprise more than 1% and less than or equal to 30% of the oligomer, by weight based on the weight of the multistage polymer particles.

13. The process of claim 12, comprising: first forming the polymer A, and optionally forming the polymer B in the presence of the obtained polymer A; followed by forming the oligomer.

* * * * *